Oct. 23, 1923.
L. HASTY
MILK CAN PUNCH
Filed June 16, 1922
1,471,601
Fig. 1.
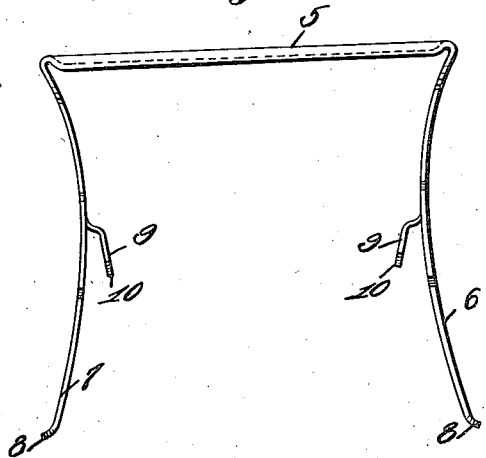
Fig. 2.
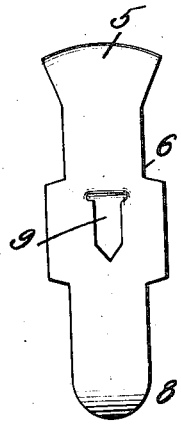
Fig. 3.
L. Hasty, Inventor
By C. A. Snow & Co.
Attorney Patented Oct. 23, 1923.

1,471,601

UNITED STATES PATENT OFFICE.

LEROY HASTY, OF SAN DIEGO, CALIFORNIA.

MILK-CAN PUNCH.

Application filed June 16, 1922. Serial No. 568,754.

*To all whom it may concern:*

Be it known that I, LEROY HASTY, a citizen of the United States, residing at San Diego, in the county of San Diego and State of California, have invented a new and useful Milk-Can Punch, of which the following is a specification.

This invention relates to implements for punching can tops or the like, the primary object of the invention is to provide a device of this character, stamped from a length of metal, portions of the metal being curved to provide guides for guiding the implement to its work.

Another object of the invention is to provide tongues or punches of constructions to be readily and easily driven into the can, the punches being however stamped from the side arms of the implement.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing:

Figure 1 is an elevational view of an implement constructed in accordance with the present invention.

Figure 2 is a plan view thereof.

Figure 3 is an end elevational view of the implement.

Referring to the drawing in detail, the device embodies a length of relatively wide metal, the same being formed into a handle portion 5 and opposed arms 6 and 7 respectively.

These arms are curved as clearly shown by Figure 1 of the drawing, the extreme ends thereof being extended outwardly as at 8 to engage the upper edges of the can and cause the arms 6 and 7 to be forced outwardly, when the implement is moved to accomplish the punching result.

Disposed intermediate the ends of the arms are integral punching elements 9 which are stamped from the arms and forced inwardly, the ends thereof being tapered as at 10 to cause the same to readily pierce a can top to form openings therein.

From the foregoing it will be seen that I have provided a punching implement that will be used with facility, in simultaneously punching openings in a can top to permit the contents thereof to be readily poured therefrom.

Having thus described the invention, what is claimed as new is:

1. A punching implement comprising a handle portion, arms formed integral with the handle portion, punching elements extending inwardly and downwardly from the arms and said punching elements having tapered end portions.

2. A punching implement comprising a handle portion, arms formed integral with the handle portion, said arms being curved throughout their lengths to guide the implement over a can, and punching elements formed integral with the arms and extending inwardly and downwardly therefrom.

3. A punching implement comprising a handle portion, arms formed integral with the handle portion and extending at right angles thereto, said arms being curved throughout their lengths and having their extremities extended outwardly, and punching elements carried by the arms and disposed intermediate their ends.

In testimony that I claim the foregoing as my own, I have hereto affixed my signature in the presence of two witnesses.

LEROY HASTY.

Witnesses:
 CLAUDE M. SHELL,
 MADGE E. SCHROCK.